US012493636B1

(12) United States Patent
Agarwal et al.

(10) Patent No.: US 12,493,636 B1
(45) Date of Patent: Dec. 9, 2025

(54) HIERARCHICAL AGENTIC RETRIEVAL AND REASONING SYSTEM

(71) Applicant: SAP SE, Walldorf (DE)

(72) Inventors: Bhavik Agarwal, Baltimore, MD (US);
Sebastian Schreiber, Redwood City, CA (US); Yue Yu, Sunnyvale, CA (US);
Rebecca Danford, Seattle, WA (US);
Aarti Arikatala, San Francisco, CA (US); Anil Babu Ankisettipalli, Fremont, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/022,406

(22) Filed: Jan. 15, 2025

(51) Int. Cl.
*G06F 16/33* (2025.01)
*G06F 16/332* (2019.01)
*G06F 16/334* (2025.01)
*G06F 16/335* (2019.01)

(52) U.S. Cl.
CPC ...... *G06F 16/3326* (2019.01); *G06F 16/3347* (2019.01); *G06F 16/335* (2019.01)

(58) Field of Classification Search
CPC . G06F 16/3326; G06F 16/3347; G06F 16/335
USPC ........ 707/737, 749, 765, 769, 771, 999.003, 707/999.006, 17.058
See application file for complete search history.

(56) References Cited

U.S. PATENT DOCUMENTS

| 12,045,288 | B1* | 7/2024 | Barut | G06F 16/532 |
|---|---|---|---|---|
| 2020/0311542 | A1* | 10/2020 | Wang | G06F 16/245 |
| 2022/0207410 | A1* | 6/2022 | Harary | G06N 3/09 |
| 2024/0062411 | A1* | 2/2024 | Yoshida | G06F 16/58 |
| 2025/0124264 | A1* | 4/2025 | Wang | G06F 40/166 |
| 2025/0190454 | A1* | 6/2025 | Patil | G06F 16/3326 |
| 2025/0245715 | A1* | 7/2025 | McNabb | G06Q 30/0643 |

* cited by examiner

*Primary Examiner* — Md I Uddin
(74) *Attorney, Agent, or Firm* — SCHWEGMAN LUNDBERG & WOESSNER, P.A.

(57) ABSTRACT

Systems and methods select a candidate scenario of a plurality of scenarios in a scenario group associated with a hard level, based on a user query, generate a candidate selection rationale using a first machine learning model and analyze, using a second machine learning model, the user query, the candidate scenario, and the candidate selection rationale to generate a selection decision and selection decision feedback. The systems and methods further, until a selection decision is positive or a maximum number of iterations has been reached, select a new candidate scenario of the plurality of scenarios in the scenario group and generate a new candidate selection rational for based on the user query and the selection decision feedback, using the first machine learning model, and generate a new selection decision and new selection decision feedback based on the user query and new candidate selection rationale, using the second machine learning model.

18 Claims, 7 Drawing Sheets

HIERARCHICAL AGENTIC RETRIEVAL AND REASONING SYSTEM

BACKGROUND

Computing systems, such as enterprise systems, have a complex set of discrete systems each comprising vast amounts of data that is structured in many different ways. These systems typically have various tools for searching data to match user queries. It can be difficult and computationally intense to accurately match data to user queries in these systems.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
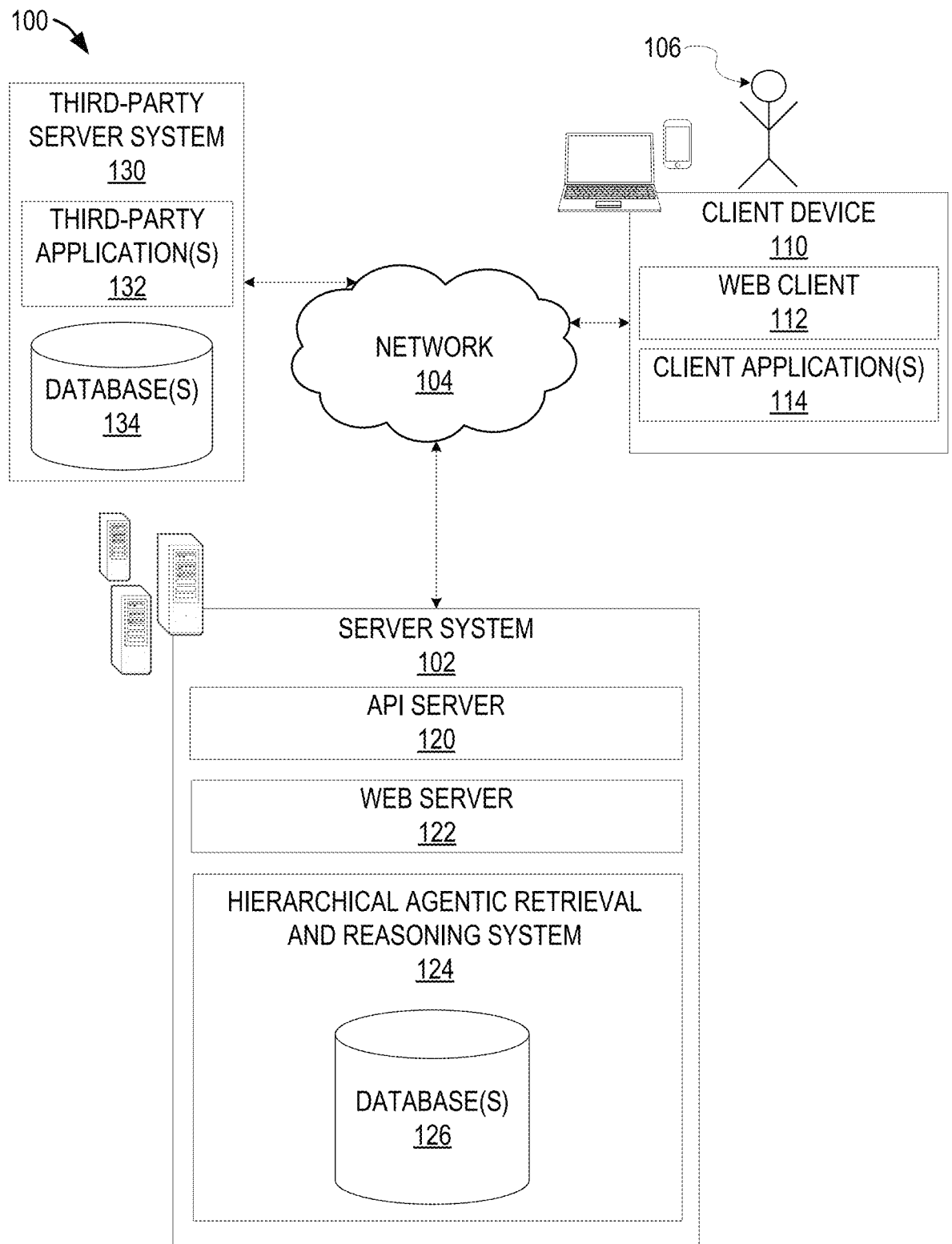
FIG. 1 is a block diagram illustrating a networked system, according to some examples.

As mentioned above, it can be difficult and computationally intense to accurately match data to user queries in computing systems that have vast amounts of data that is structured in many different ways. Complexity further arises from the high degree of similarity and overlap among many different scenarios that may match a user query. These nuanced differences make it difficult to distinguish between different scenarios using traditional retrieval methods, such as a single-step retrieval-based approach. This challenge is significant because improper scenario routing leads to incorrect execution, ultimately resulting in a poor user experience and a waste of computing resources.

For example, a query such as "Can you tell me how much leave I have for next month?My ID is 012345ABC" ideally is mapped to a specific scenario for an amount of leave associated with an employee ID which triggers one or more application programming interfaces (APIs) to access a leave request portal and calculate a vacation day balance for the user. However, there may be several scenarios related to a leave (e.g., vacation time, sick leave, parental leave, disability leave) that are very similar and thus, it may be difficult to determine which scenario is the most accurate to use to respond to the query. Scenarios that exhibit a high degree of semantic similarity and overlap in functionality cause traditional retrieval methods to struggle with accurately identifying the correct scenario which can result in errors in execution.

Further, existing machine learning models source their training data from a limited set of publicly available platforms that typically deal with distinguishable APIs that have minimal overlap. However, as mentioned above, large computing systems, such as enterprise systems, typically have scenarios that often exhibit significant semantic overlap and thus, create a unique challenge that these function-calling models were not originally designed to handle. This misalignment was evident in subpar performance observed in testing these models on enterprise system specific API data. The scenarios constructed from the specific API data made it challenging for even advanced machine learning models, such as large language models (LLMs), to accurately target the correct scenario. Attempting to enhance the scenario routing capabilities of existing function calling LLMs would consume more computation resources and increase the risk of overfitting, potentially compromising the models' generalizability. Accordingly, there is a need for a more tailored approach to retrieval and execution in these types of systems.

Examples described herein address at least these technical problems in several ways. One way is to address the embedding space within which various machine learning models can be used to accurately retrieve scenarios (e.g., API endpoints) to match a query. The embedding space refers to the multidimensional representation of scenarios that allows for their differentiation during the retrieval and routing steps. By fine-tuning this space, examples described herein make even closely related scenarios distinguishable from one another. The current inefficacy in routing user queries to the correct scenarios stems from suboptimal scenario representations within this space. Therefore, examples described herein optimize the embedding space to improve overall query-scenario routing performance. For instance, by making scenarios as distinct and distinguishable as possible within the embedding space, examples described herein significantly enhance routing accuracy without the downsides of overfitting or increased computations burden associated with modifying the LLMs themselves. Methods of improving the embedding space are discussed in further detail below.

Accordingly, scenarios can be designed to be more distinguishable from one another in text space which results in an optimized embedding space representation, particularly when a selection must be made from multiple similar options. By enhancing the distinctiveness of scenarios, examples described herein can more accurately evaluate the true capabilities of different LLMs as routing agents. This enhancement allows for a more precise assessment of LLM performance, free from the confusions caused by overlapping scenario representations. Ultimately, this contributes to a significant improvement in the end-to-end query-to-scenario routing process, grounded in a robust and reliable benchmark.

In additional to optimizing the scenario search space, examples herein provide a hierarchical, reasoning-based approach that enhances the performance of the retrieval and machine learning model (e.g., LLM) reasoning pipeline and is adaptive to the complexity level of the scenario sub-space. This process first maps a user query to a most relevant predefined scenario group and then refines the selection to identify the best matching scenario, filling in the necessary slot values. In some examples, this process further integrates agentic capabilities, such as self-reflection and refinement, to enhance the efficacy of the routing capabilities. These advanced features allow the model to iteratively improve its routing decisions, leading to more accurate and context-aware results. Applying these agentic capabilities indiscriminately across all subspaces, however, could result in unnecessary increases in both cost and latency, particularly in less complex cases where simpler routing strategies would suffice base implementing such sophisticated mechanisms comes with the trade-off of increased computational costs (e.g., input/output tokens) and resource transactions and may result in higher latencies. Furthermore, not all scenario substances without the routing domain exhibit equal complexity, and thus may not necessitate such an advanced solution. Accordingly, examples described herein only utilize these advanced features in more complex cases where a simpler routing strategy would not suffice as explained in further detail below.

By selectively applying advance reasoning only when necessary, such as when queries are ambiguous or scenarios exhibit a significant overlap, even with refined embeddings, the system described herein improves overall performance while conserving computations resources resulting in difficulty-optimal system latency. This approach reduces confounding factors through hierarchical grouping of scenarios, methodically addresses their semantic similarities, and increases the likelihood of accurately differentiating and executing the best matching scenario, even in the presence of query ambiguities. Ultimately, this optimization helps the system meet stringent accuracy requirements and enhances the user experience.

FIG. 1 is a block diagram illustrating a networked system 100, according to some example embodiments. The system 100 can include one or more client devices such as client device 110. The client device 110 can comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 comprises a display module (not shown) to display information (e.g., in the form of user interfaces). In further embodiments, the client device 110 can comprise one or more of touch screens, accelerometers, gyroscopes, cameras, microphones, global positioning system (GPS) devices, and so forth. The client device 110 can be a device of a user 106 that is used to access and utilize a hierarchical agentic retrieval and reasoning system 124 for queries or related features, among other applications.

One or more users 106 may be a person, a machine, or other means of interacting with the client device 110. In example embodiments, the user 106 may not be part of the system 100 but may interact with the system 100 via the client device 110 or other means. For instance, the user 106 can provide input (e.g., touch screen input or alphanumeric input) to the client device 110 and the input can be communicated to other entities in the system 100 (e.g., third-party server system 130, server system 102) via a network 104. In this instance, the other entities in the system 100, in response to receiving the input from the user 106, communicate information to the client device 110 via the network 104 to be presented to the user 106. In this way, the user 106 can interact with the various entities in the system 100 using the client device 110.

The system 100 further includes a network 104. One or more portions of network 104 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 can access the various data and applications provided by other entities in the system 100 via web client 112 (e.g., a browser, such as the Internet Explorer® browser developed by Microsoft® Corporation of Redmond, Washington State) or one or more client applications 114. The client device 110 can include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for accessing and utilizing the hierarchical agentic retrieval and reasoning system 124, and the like.

In some embodiments, one or more client applications 114 are included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access the hierarchical agentic retrieval and reasoning system 124, and so forth), and so forth. Conversely, one or more client applications 114 may not be included in the client device 110, and then the client device 110 can use its web browser to access the one or more applications hosted on other entities in the system 100 (e.g., third-party server system 130, server system 102).

A server system 102 provides server-side functionality via the network 104 (e.g., the Internet or wide area network (WAN)) to one or more third-party server system 130 and/or one or more client devices 110. The server system 102 can include an application program interface (API) server 120, a web server 122, and hierarchical agentic retrieval and reasoning system 124 that can be communicatively coupled with one or more databases 126.

The one or more databases 126 comprise storage devices that store data related to users of the system 100, applications associated with the system 100, cloud services, machine learning models, data related to entities/products/services, and so forth. The one or more databases 126 can further store information related to third-party server system 130, third-party applications 132, third-party database(s) 134, client devices 110, client applications 114, users 106, and so forth. In one example, the one or more databases 126 is cloud-based storage. In some examples, one or more databases 126 stores data related to scenarios, APIs and related information, and other data utilized by the hierarchical agentic retrieval and reasoning system 124, as explained in further detail below.

The server system 102 can be a cloud computing environment, according to some example embodiments. The server system 102, and any servers associated with the server system 102, can be associated with a cloud-based application, in one example embodiment.

The hierarchical agentic retrieval and reasoning system 124 provides back-end support for third-party applications 132 and client applications 114, which can include cloud-based applications. The hierarchical agentic retrieval and reasoning system 124 provides for matching a given user inquiry to a correct scenario, among other functions as described in further detail below. The hierarchical agentic retrieval and reasoning system 124 can comprise one or more servers or other computing devices or systems.

The system 100 further includes one or more third-party server system 130. The one or more third-party server system 130 can include one or more third-party application(s). The one or more third-party application(s) 132, executing on third-party server(s) 130, can interact with the server system 102 via API server 120 via a programmatic interface provided by the API server 120. For example, one or more of the third-party applications 132 can request and utilize information from the server system 102 via the API server 120 to support one or more features or functions on a website hosted by the third party or an application hosted by the third party.

The third-party website or application 132, for example, can provide access to functionality and data supported by third-party server system 130. In one example embodiment, the third-party website or application 132 provides access to functionality that is supported by relevant functionality and data in the third-party server system 130. In another example, a third-party server system 130 is a system associated with an entity that accesses cloud services via server system 102.

The third-party database(s) 134 can be storage devices that store data related to users of the third-party server system 130, applications associated with the third-party server system 130, cloud services, machine learning models, parameters, and so forth. The one or more databases 126 can further store information related to third-party applications 132, client devices 110, client applications 114, users 106, and so forth. In one example, the one or more databases 134 are cloud-based storage.

Figure 2:
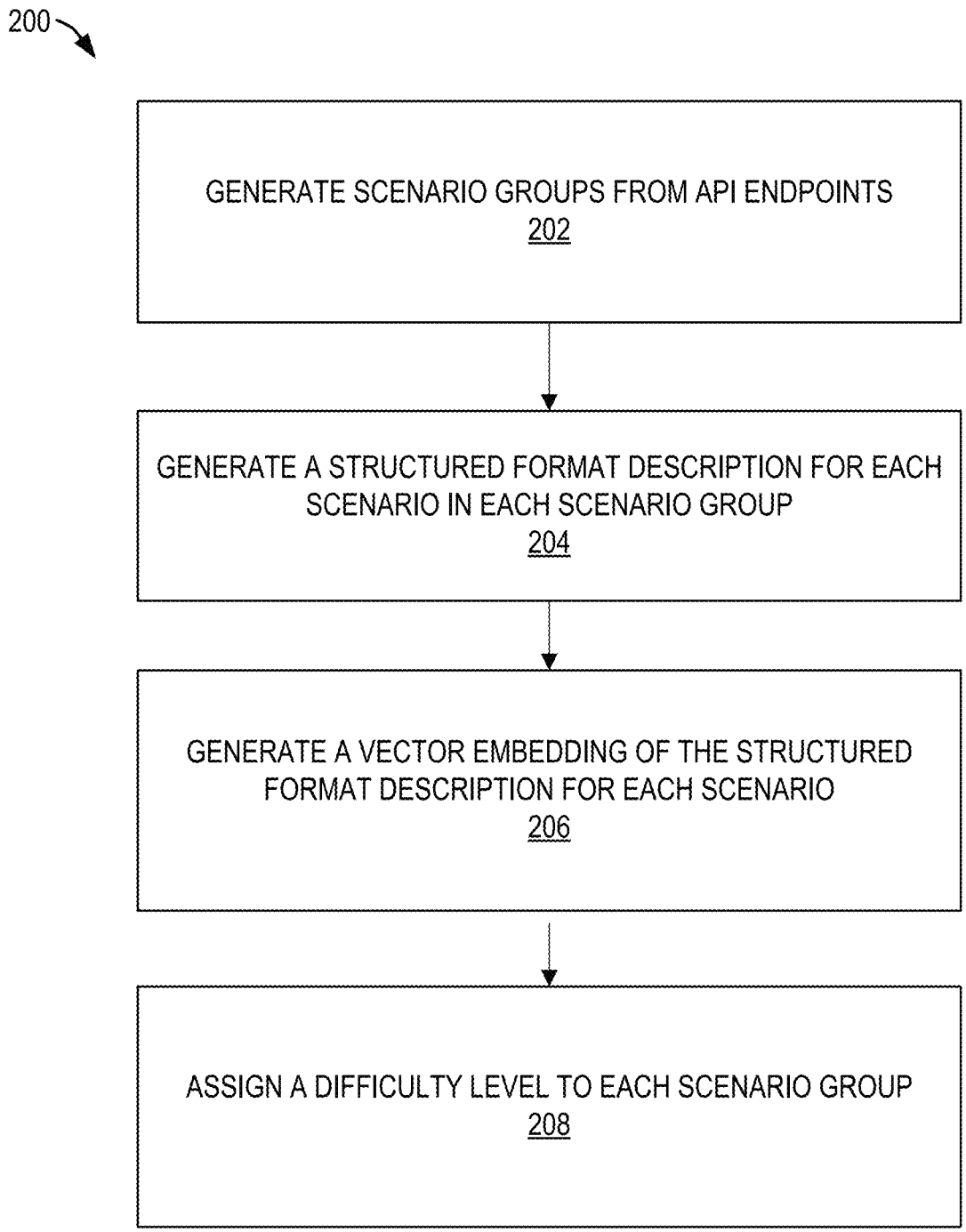
FIG. 2 is a flow chart illustrating aspects of a method for generating scenario groups, according to some examples.

FIG. 2 is a flow chart illustrating aspects of a method 200, for generating scenario groups, according to some example embodiments. For illustrative purposes, method 200 is described with respect to the block diagram of FIG. 1. It is to be understood that method 200 can be practiced with other system configurations in other embodiments.

In operation 202, a computing system, such as the server system 102 or hierarchical agentic retrieval and reasoning system 124, generates scenario groups from API endpoints. For example, the computing system generates a plurality of scenario groups of a plurality of API endpoints where each scenario group of the plurality of group comprises one or more scenario and each scenario comprises an API endpoint. Typical enterprise systems can have tens of thousands or hundreds of thousands of API endpoints. The API endpoints are components of an API and are typically structured as a uniform resource locator (URL), such as the following example API endpoints:

/contractmaketing
/contractmarketing/det
/contractmarketing/det/(parameter1)/(parameter2)
/contractmarketing/hdr
/contractmarketing/hdr/update
/plantexclusion
/plantexclusion/(parameter1)
/translate
. . .

The computing system generates the plurality of scenario groups based on a URL structure of each API endpoint. Using the above example, the computing system generates a scenario group for each of the root terms of the API endpoints. In this example, a first scenario group would be contractmarketing, a second scenario group would be plantexclusion, a third scenario group would be translate, and so forth for all of the API endpoint root terms. The computing system can further generate a hierarchy comprising the API endpoints within each scenario group, such as det and hdr as API endpoints under the contractmarketing scenario group, hdr as an API endpoint under the platexclusion scenario group, and so forth. In this way, each scenario group comprises one or more API endpoints.

By generating the plurality of scenario groups, the decision process is greatly reduced from choosing from among tens of thousands or hundreds of thousands of individual API endpoints for a given user query to choosing between tens or hundreds of scenario groups, greatly reducing the computing resources required for responding to a user query.

In operation 204, the computing system generates a structured format description for each scenario in each scenario group. Typically, each API endpoint has a corresponding description, which can comprise a name, an API endpoint description and/or API parameters or other data. However, the name and description are usually written by different software developers or other users in various formats and often with minimal or very little actual descriptive information. Further, there is no uniformity or format for these names or descriptions. Accordingly, the computing system rewrites the description of each API endpoint to remove ambiguity.

In some examples, the computing system uses a machine learning model, such as a large language model (e.g., Claude, ChatGPT, Gemini, etc.), to generate a structured format description for each scenario, using at least one of an API name, and API endpoint description, API parameters, or other data associated with the API endpoint. In this way, the computing system generates, from the API endpoint description, a structured natural language description for each API endpoint that can be used to differentiate between endpoints to make selecting an endpoint for a given user query more accurate.

In operation 206, the computing system generates a vector embedding of the structured format description for each scenario. For example, the computing system converts each structured format description for each scenario into a vector embedding using an embedding model, such as Gemma Embeddings (Google), NV-Embed (Nvidia), Text-Embedding-3-large (OpenAI), or the like.

In operation 208, the computing system assigns a difficulty level to each scenario group. For example, for each scenario group, the computing system determines a similarity (e.g., using cosine similarity or similar technique) between each vector embedding for each pair of scenarios in the scenario group and a number of scenarios in the scenario group to generate an overall similarity score for each scenario group. In some examples, the overall similarity score indicates an average distance point in a cluster in the scenario group giving an indication of how close or how spread out the individual scenarios (API endpoints) are in the scenario group.

The computing system assigns a difficultly level to each scenario group based on the overall similarity score. A low similarity score indicates that the scenarios in the group are more distinct from each other, a high similarity score indicates that the scenarios in the group very similar to each other, and a medium similarity score indicates a more moderate degree of differentiation or similarity. For instance, a low similarity score (e.g., a score below a predefined value) corresponds to an easy level, a medium similarity score (e.g., a score within a predefined value range) corresponds to a medium level, and a high similarity score (e.g., above a predefined value) corresponds to a hard level.

Figure 3:
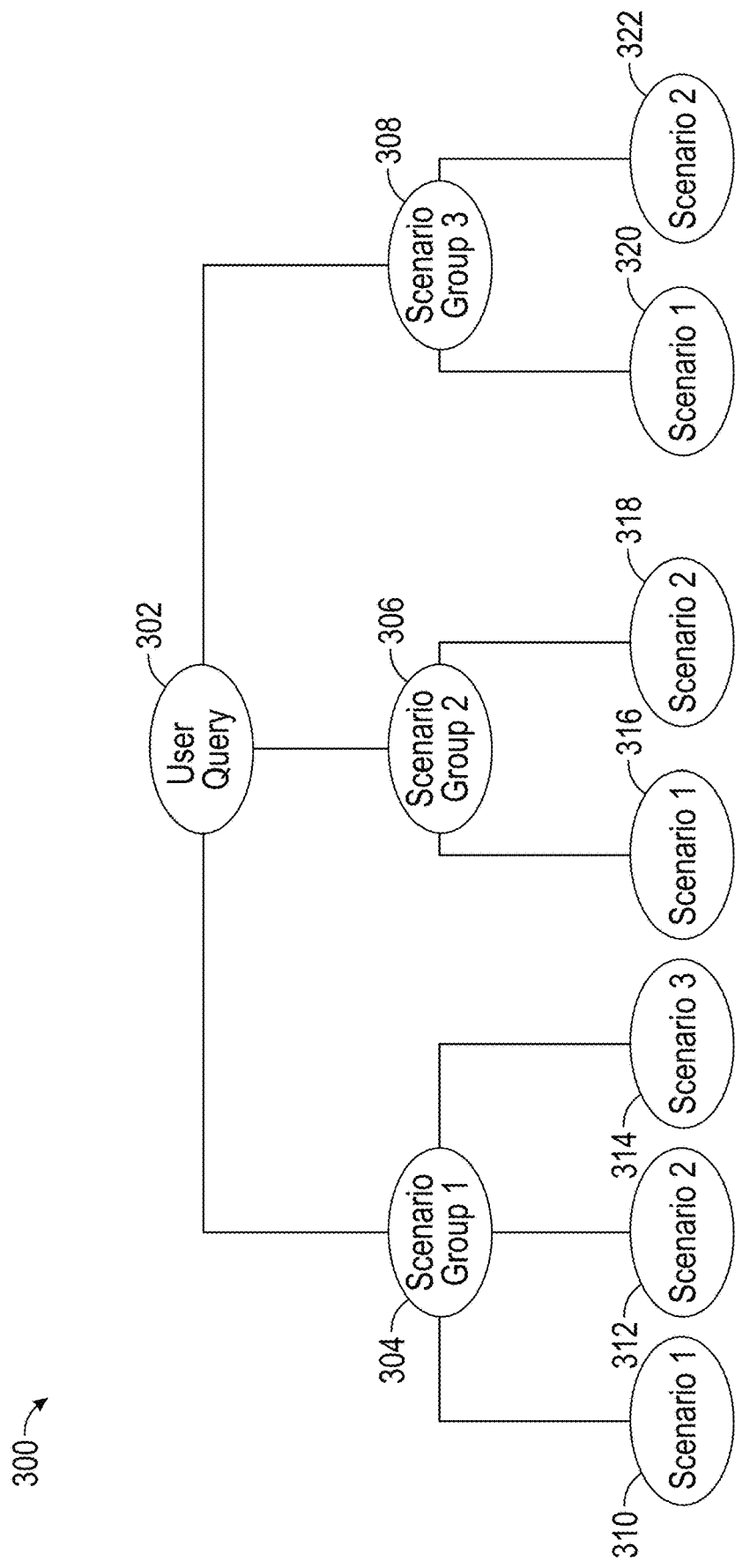
FIG. 3 is a diagram illustrating a hierarchy example, according to some examples.

FIG. 3 is a diagram 300 illustrating a very simple hierarchy example with scenario groups assigned to each of these levels. For example, scenario group 1 (304) is associated with the hard level and comprises various scenarios, including scenario 1 (310), scenario 2 (312) and scenario 3 (314). Scenario group 1 (304) represents a complex embedding space with high overlap among its scenarios, making it the most challenging group. To pick a correct scenario for a given query from scenario group 1, a more complex method is used, as explained in detail below.

Scenario group 2 (306) is associated with the medium level and comprises various scenarios, including scenario 1 (316) and scenario 2 (318). Scenario group 2 (306) depicts a moderately complex embedding space with some overlap in its scenarios.

Scenario group 3 (308) is associated with the easy level and comprises various scenarios, including scenario 1 (320) and scenario 2 (322). Scenario group 3 (308) represents a straightforward embedding space with minimal or no overlap among its scenarios. A less complex method can be used for scenario group 2 and 3 as explained further below. The computing system tailors its retrieval and reasoning strategies according to the complexity of each group, ensuring accurate and efficient scenario selection.

Figure 4:
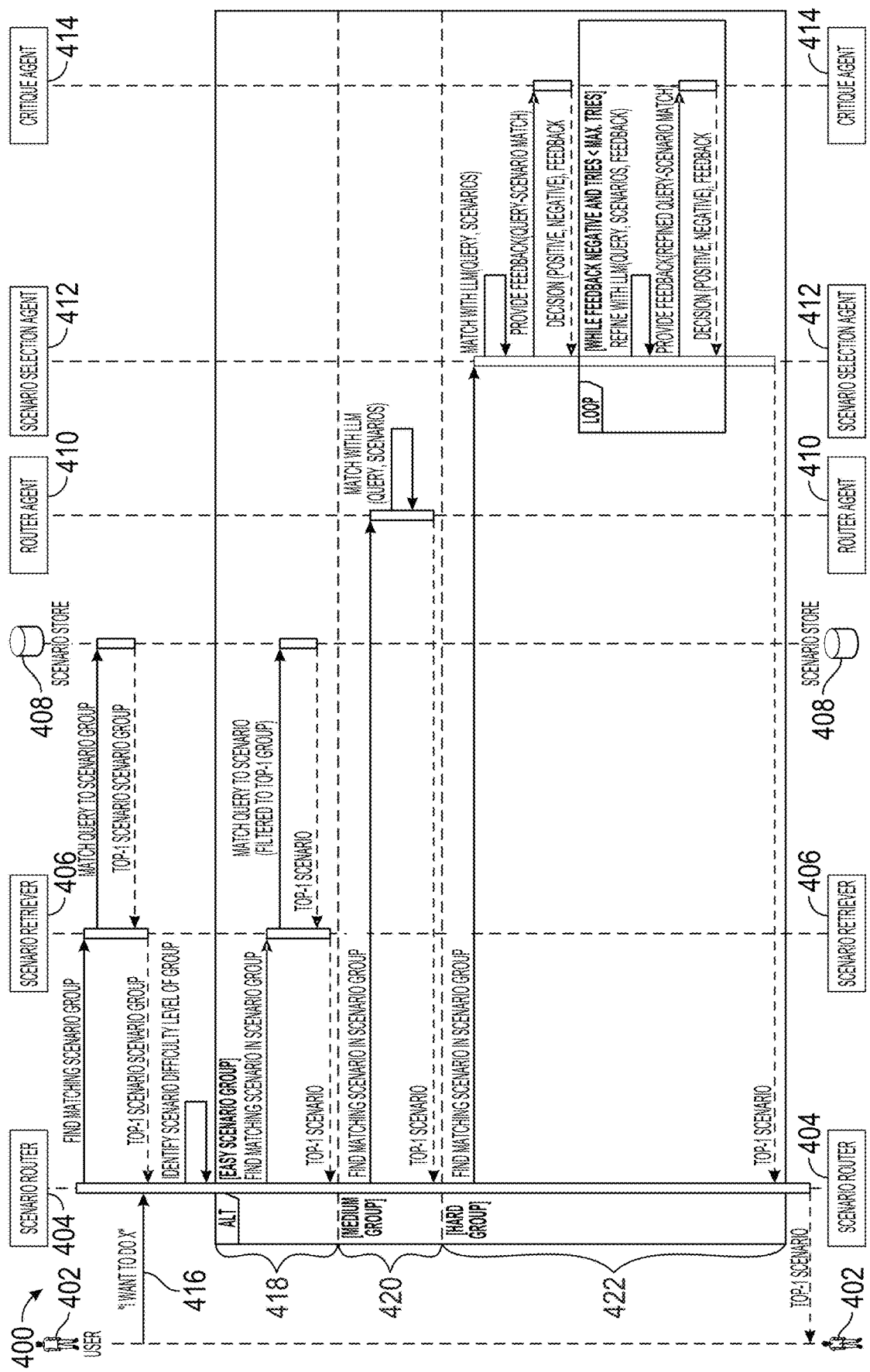
FIG. 4 is a diagram illustrating a scenario routing sequence, according to some examples.

FIG. 4 is a diagram 400 illustrating a scenario routing sequence performed by a computing system, such as the server system 102 or hierarchical agentic retrieval and reasoning system 124, that comprises a scenario router 404, a scenario retriever 406, a scenario store 408, a router agent 410, a scenario selection agent 412 and a critique agent 414. A user 402 inputs a query 416 via a computing device, such as client device 110 of FIG. 1. The scenario router 404 receives the user query 416 and requests a matching scenario group from the scenario retriever 406. The scenario retriever 406 compares the user query 416 to each of a plurality of scenario groups stored in a scenario store 408 to determine a scenario group most similar to the user query. In one example, the computing system generates a vector embedding of the user query 416, compares the vector embedding of the user query 416 to each vector embedding of each of the plurality of scenario groups using a similarity function (e.g., semantic or hybrid similarity function) and selects the scenario group most similar to the user query 416 based on an output of the similarity function. In some examples, the user query comprises the query itself as well as contextual information such as user metadata, retrieved documents, conversation history, and the like. The scenario retriever 406 returns the scenario group most similar to the user query 416 to the scenario router 404. The scenario router 404 identifies a difficulty level associated with the scenario group most similar to the user query 416. The difficultly level associated with the scenario group is the difficultly level assigned to the scenario group based on the overall similarity score, as explained above.

Based on what difficulty level is identified, a different set of functions is executed. For instance, functions 418 are executed for an easy level, functions 420 are executed for a medium level and functions 422 are executed for a hard level.

For example, when the computing system via the scenario router 404 identifies that a difficulty level associated with the scenario group most similar to the user query 416 is easy, the computing system executes the functions 418 by finding a matching scenario in the scenario group most similar to the user query 416. For example, the computing system compares the user query 416 to each scenario of a plurality of scenarios in the scenario group, stored in the scenario store 408, to determine a scenario most similar to the user query 416. In some examples this is done as explained above by comparing a vector embedding of the user query 416 to each vector embedding for each scenario. In some examples, the comparison is done using a simple RAG, semantic or hybrid similarity search, or other straight-forward method that uses minimal computing resources. The scenario retriever 406 returns the scenario most similar to the scenario group to the scenario router 404 and the scenario most similar to the scenario group is executed to generate a respond to the user query 416. In some examples, executing the scenario can comprise filling parameter inputs using a machine learning model.

In another example, when the computing system via the scenario router 404 identifies that a difficulty level associated with the scenario group most similar to the user query 416 is medium, the computing system executes the functions 420 by analyzing, using a machine learning model such as an LLM, the user query 416 and each scenario of a plurality of scenarios in the second scenario group to determine a scenario most similar to the user query 416. The machine learning model for the medium difficulty level is a faster, lightweight open-source function-calling LLM, sch as variants of Mistral, Llama and the like. The router agent 410 returns the scenario most similar to the scenario group to the scenario router 404 and the scenario most similar to the scenario group is executed to generate a response to the user query 416.

In another example, when the computing system via the scenario router 404 identifies that a difficulty level associated with the scenario group most similar to the user query 416 is hard, the computing system executes the functions 422 by utilizing a selection agent 412 and critique agent 414 for agentic reasoning capabilities. The selection agent 412 proposes the best matching scenario (referred to below as a candidate scenario or new candidate scenario) along with rationale in natural language to the critique agent 414, using a more powerful machine learning model with advance reasoning capabilities, such as an LLM with a customized prompt. The selection agent 412 also considers any feedback provided by the critique agent 414 in previous iterations (if it is not the first iteration). The critique agent 414 evaluates the proposed scenario from the selection agent 412, using the provided rationale, to perform a decision. The decision, or output, from the critique agent 414 comprises a natural language feedback (rationale) that explains the reasoning behind the decision and a Boolean indicating whether the feedback is positive (e.g., 1) or negative (e.g., 0). If the feedback is positive, the loop ends, and the chosen scenario is executed. If the feedback is negative, the critique agent 414 passes the feedback back to the selection agent 412. The loop continues between the selection agent 412 and the critique agent until a positive decision is made or a maximum retry limit (e.g., 2, 3, 5) is reached—in this case the computing system can ask the user for additional information. This process related to the hard level is discussed in further detail next.

Figure 5:
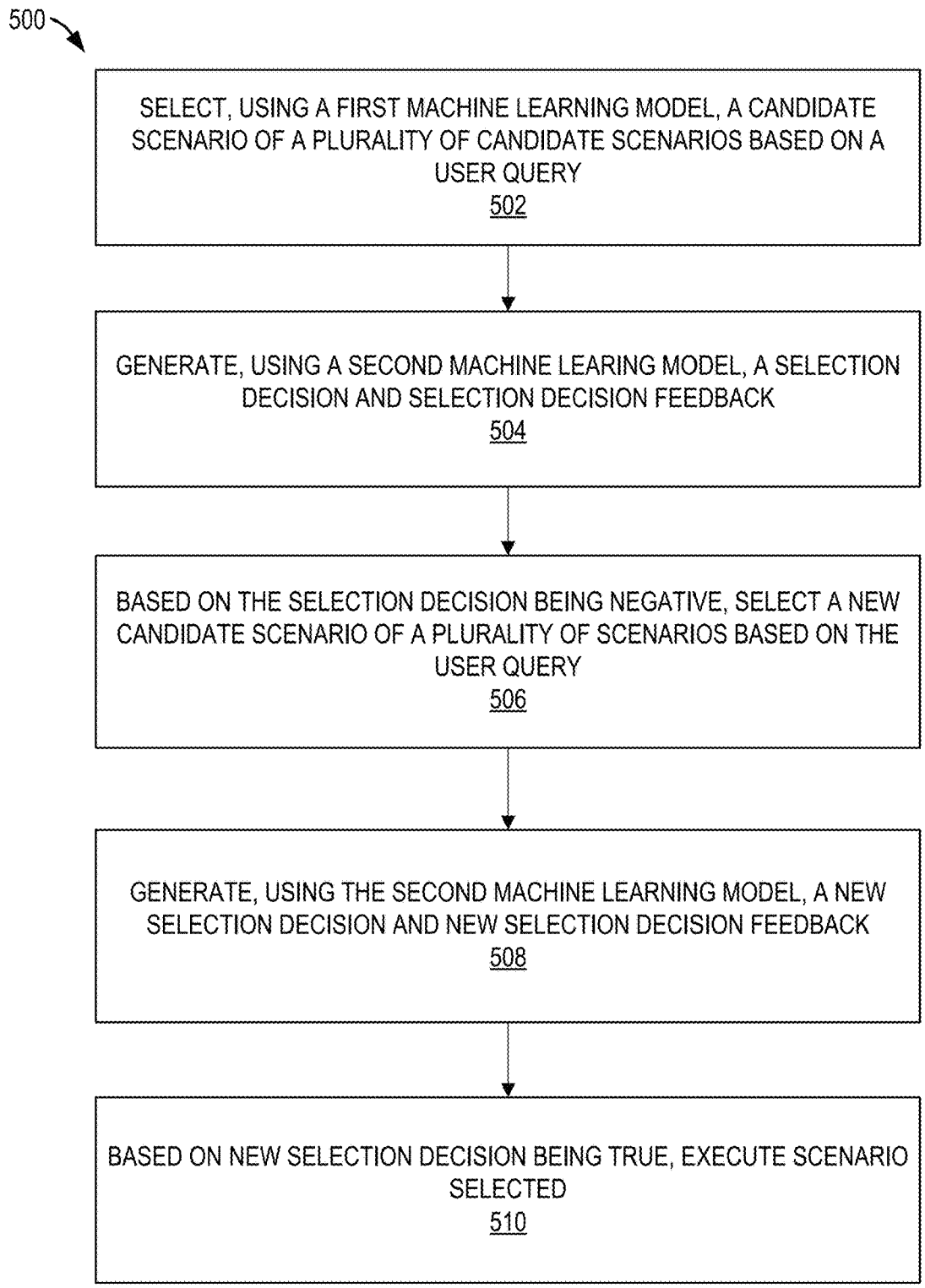
FIG. 5 is a flow chart illustrating aspects of a method for selecting a scenario of a plurality of scenarios in a group scenario associated with a hard level, according to some examples.

FIG. 5 is a flow chart illustrating aspects of a method 500, for selecting a scenario of a plurality of scenarios in a group scenario associated with a hard level, according to some example embodiments. For illustrative purposes, method 500 is described with respect to the block diagram of FIG. 1. It is to be understood that method 500 can be practiced with other system configurations in other embodiments.

As described above, a computing system, such as the server system 102 or hierarchical agentic retrieval and reasoning system 124, receives a user query, compares the user query to each of a plurality of scenario groups to determine a scenario group most similar to the user query and identifies a difficulty level associated with the scenario group most similar to the user query. As explained above, the computing system can compare the user query to each of the plurality of scenario groups using a semantic or hybrid similarity function, or the like, to determine a scenario group most similar to the user query. Based on determining that the difficulty level of the scenario group most similar to the user query is a hard level, the computing system performs the operations of method 500.

In operation 502, a computing system selects, using a first machine learning model, a candidate scenario of a plurality of candidate scenarios based on the user query (e.g., via scenario selection agent 412). In some examples, the computing system selects a candidate scenario of a plurality of scenarios in the scenario group based on the user query and generates a candidate selection rationale, using the first machine learning model. In some examples, the first machine learning model is prompted to analyze the user query and the plurality of scenarios in the scenario group most similar to the user query to select a candidate scenario and generate a rationale in natural language for selecting the candidate scenario. And example output from the first machine learning model can be in a format "<Reason> rationale </Reason> <Answer> scenario_selection_suggestion </Answer>.

In operation 504, the computing system generates, using a second machine learning model, a selection decision and selection decision feedback (e.g., via the critique agent 414). For example, the computing system analyzes, using the second machine learning model, the user query as well as the candidate scenario and candidate selection rational generated by the first machine learning model. Based on this analysis the second machine learning model generates a selection decision and selection decision feedback. In one example, the selection decision is a Boolean indicating whether the feedback is positive (1) or negative (0) and the feedback is a natural language rationale that explains the reasoning behind the decision. A positive selection decision indicates that the candidate scenario is a correct selection, and a negative selection decision indicates that the candidate scenario is not the best selection.

In some examples, the first machine learning model and the second machine learning models are both strong LLMs such as a GPT-4o or Claude 3.5 Sonnet. In some examples, models from the same model family are used for the first machine learning model and the second machine learning model where a different prompt is used for the first machine learning model than a prompt used for the second machine learning model to differentiate the tasks between the two models. For example, both models can be GPT-4o models but a first prompt is used for the first machine learning model and a different second prompt is used for the second machine learning model.

In other examples, models from different model families are used for the first machine learning model and the second machine learning model. For example, a GPT-4o model is used for the first machine learning model and a Claude 3.5 model is used for the second machine learning model (or vice versa). It may be a preferred strategy to use models from different families to counter some biases inherent to these models. For instance, there is work which found that when using a GPT-4-based model to evaluate text generated by a GPT-4-based model, it might be biased to favor its own outputs whereas when using a model from a different family or provider for such quality control operations, these effects are not commonly observed. GPT-4 and Claude models are used here as examples, but it is to be understood that other similar models of different types or families can be used in examples described herein.

The computing system determines whether the selection decision is positive or negative. If the computing system determines that the selection decision is positive, the computing system selects and executes the candidate scenario (operation 510, described below). If the computing system determines that the selection decision is negative, the computing system performs operations 506 and 508 until a selection decision is positive or a maximum number of iterations has been reached.

In operation 506, the computing system selects a new candidate scenario of the plurality of scenarios in the scenario group and generates a new candidate selection rationale for the selection of the new candidate scenario, based on the user query and the selection decision feedback, using the first machine learning model. Instead of just analyzing the user query and the plurality of candidate scenarios in the scenario group as in operation 502, this time the first machine learning model also analyzes the feedback from the second machine learning model for the negative selection decision. Accordingly, the first machine learning model considers the user query, the plurality of scenarios in the scenario group, and the feedback comprising the natural language rationale that explains the reasoning behind the negative selection decision to select the new candidate scenario and generate the new candidate selection rationale.

In operations 508, the computing system generates a new selection decision and new selection decision feedback based on the user query and new candidate selection rationale, using the second machine learning model. For example, the second machine learning model analyzed the user query, the new candidate selection and the new candidate selection rationale to generate a new selection decision and a new selection decision feedback, as explained above.

In operation 510, based on determining that the new selection decision is positive (after one or more loops), the computing system executes a scenario associated with the new selection decision. In some examples, executing the scenario associated with the new selection decision comprises executing an API endpoint for the scenario associated with the new selection decision.

Based on determining that the selection decision is negative and a maximum number of iterations has been reached, the computing system requests further information about the user query to use to determine a correct scenario. The computing system then uses the new information as a new user query to go through the process in FIG. 5 again. The computing system can use the new information as a separate new query or can add the new information to the previous query and use both as the user query to analyze in the operations of FIG. 5.

In view of the above disclosure, various examples are set forth below. It should be noted that one or more features of an example, taken in isolation or combination, should be considered within the disclosure of this application.

Example 1. A computer-implemented method comprising:
  receiving a user query;
    comparing the user query to each of a plurality of scenario groups to determine a scenario group most similar to the user query;
    identifying a difficulty level associated with the scenario group most similar to the user query;
    based on determining that the difficulty level is a hard level, selecting a candidate scenario of a plurality of scenarios in the scenario group based on the user query and generating a candidate selection rationale using a first machine learning model;
    analyzing, using a second machine learning model, the user query, the candidate scenario, and the candidate selection rationale to generate a selection decision and selection decision feedback;
    based on determining that the selection decision is negative, performing, until a selection decision is positive or a maximum number of iterations has been reached, operations comprising:
      selecting a new candidate scenario of the plurality of scenarios in the scenario group and generating a new candidate selection rational for based on the user query and the selection decision feedback, using the first machine learning model; and
      generating a new selection decision and new selection decision feedback based on the user query and new candidate selection rationale, using the second machine learning model; and
    based on determining that the new selection decision is positive, executing a scenario associated with the new selection decision.

Example 2. A computer-implemented method according to any of the previous examples, wherein comparing the user query to each of the plurality of scenario groups to determine the scenario group most similar to the user query comprises:
  generating a vector embedding of the user query;
  comparing the vector embedding of the user query to each vector embedding of each of the plurality of scenario groups using a similarity function; and
  selecting the scenario group most similar to the user query based on an output of the similarity function.

Example 3. A computer-implemented method according to any of the previous examples, wherein based on determining that the selection decision is negative and a maximum number of iterations has been reached, requesting further information about the user query.

Example 4. A computer-implemented method according to any of the previous examples, further comprising:
  receiving a second user query;
  comparing the second user query to each of the plurality of scenario groups to determine a second scenario group most similar to the second user query;
  identifying a difficulty level associated with the second scenario group most similar to the second user query;
  based on determining that the difficulty level is an easy level, comparing the second user query to each scenario of a plurality of scenarios in the second scenario group to determine a scenario most similar to the second user query; and
  executing the scenario most similar to the second user query to generate a response to the second user query.

Example 5. A computer-implemented method according to any of the previous examples, wherein comparing the second user query to each scenario of the plurality of scenarios in the second scenario group comprises using a semantic or hybrid similarity search to determine the scenario most similar to the second user query.

Example 6. A computer-implemented method according to any of the previous examples, further comprising:
  receiving a second user query;
  comparing the second user query to each of the plurality of scenario groups to determine a second scenario group most similar to the second user query;
  identifying a difficulty level associated with the second scenario group most similar to the second user query;
  based on determining that the difficulty level is a medium level, analyzing, using a third machine learning model the second user query and each scenario of a plurality of scenarios in the second scenario group to determine a scenario most similar to the second user query; and
  executing a scenario most similar to the second user query to generate a response to the second user query.

Example 7. A computer-implemented method according to any of the previous examples, further comprising:
  generating the plurality of scenario groups from a plurality of application programming interface (API) endpoints, each scenario group of the plurality of scenario groups comprising one or more scenario, each scenario comprising an API endpoint;
  rewriting a description corresponding to each API endpoint using a machine learning model to generate a structured format description for each scenario; and
  generating a vector embedding of the structured format description for each scenario.

Example 8. A computer-implemented method according to any of the previous examples wherein the plurality of scenario groups are generated based on a URL structure of each API endpoint.

Example 9. A computer-implemented method according to any of the previous examples wherein the description corresponding to each API endpoint comprises at least one of an API endpoint description, a name of the API endpoint, or API parameters.

Example 10. A computer-implemented method according to any of the previous examples, further comprising:
  for each scenario group, determining a similarity between each vector embedding for each pair of scenarios in the scenario group to generate an overall similarity score for each scenario group; and
  assigning a difficultly level to each scenario group based on the overall similarity score and a number of scenarios in the scenario group, wherein a low similarity score corresponds to an easy level, a medium similarity score corresponds to a medium level, and a high similarity score corresponds to the hard level.

Example 11. A computer-implemented method according to any of the previous examples, wherein executing the scenario associated with the new selection decision comprises executing an API endpoint for the scenario associated with the new selection decision.

Example 12. A system comprising:
  a memory that stores instructions; and
    one or more processors configured by the instructions to perform operations comprising:

receiving a user query;
comparing the user query to each of a plurality of scenario groups to determine a scenario group most similar to the user query;
identifying a difficulty level associated with the scenario group most similar to the user query;
based on determining that the difficulty level is a hard level, selecting a candidate scenario of a plurality of scenarios in the scenario group based on the user query and generating a candidate selection rationale using a first machine learning model;
analyzing, using a second machine learning model, the user query, the candidate scenario, and the candidate selection rationale to generate a selection decision and selection decision feedback;
based on determining that the selection decision is negative, performing, until a selection decision is positive or a maximum number of iterations has been reached, operations comprising:
selecting a new candidate scenario of the plurality of scenarios in the scenario group and generating a new candidate selection rational for based on the user query and the selection decision feedback, using the first machine learning model; and
generating a new selection decision and new selection decision feedback based on the user query and new candidate selection rationale, using the second machine learning model; and
based on determining that the new selection decision is positive, executing a scenario associated with the new selection decision.

Example 13. A system according to any of the previous examples, wherein comparing the user query to each of the plurality of scenario groups to determine the scenario group most similar to the user query comprises:
generating a vector embedding of the user query;
comparing the vector embedding of the user query to each vector embedding of each of the plurality of scenario groups using a similarity function; and
selecting the scenario group most similar to the user query based on an output of the similarity function.

Example 14. A system according to any of the previous examples, wherein based on determining that the selection decision is negative and a maximum number of iterations has been reached, requesting further information about the user query.

Example 15. A system according to any of the previous examples, the operations further comprising:
receiving a second user query;
comparing the second user query to each of the plurality of scenario groups to determine a second scenario group most similar to the second user query;
identifying a difficulty level associated with the second scenario group most similar to the second user query;
based on determining that the difficulty level is an easy level, comparing the second user query to each scenario of a plurality of scenarios in the second scenario group to determine a scenario most similar to the second user query; and
executing the scenario most similar to the second user query to generate a response to the second user query.

Example 16. A system according to any of the previous examples, wherein comparing the second user query to each scenario of the plurality of scenarios in the second scenario group comprises using a semantic or hybrid similarity search to determine the scenario most similar to the second user query.

Example 17. A system according to any of the previous examples, the operations further comprising:
receiving a second user query;
comparing the second user query to each of the plurality of scenario groups to determine a second scenario group most similar to the second user query;
identifying a difficulty level associated with the second scenario group most similar to the second user query;
based on determining that the difficulty level is a medium level, analyzing, using a third machine learning model the second user query and each scenario of a plurality of scenarios in the second scenario group to determine a scenario most similar to the second user query; and
executing a scenario most similar to the second user query to generate a response to the second user query.

Example 18. A system according to any of the previous examples, the operations further comprising:
generating the plurality of scenario groups from a plurality of application programming interface (API) endpoints, each scenario group of the plurality of scenario groups comprising one or more scenario, each scenario comprising an API endpoint;
rewriting a description corresponding to each API endpoint using a machine learning model to generate a structured format description for each scenario; and
generating a vector embedding of the structured format description for each scenario.

Example 19. A system according to any of the previous examples, wherein the plurality of scenario groups are generated based on a URL structure of each API endpoint.

Example 20. A non-transitory computer-readable medium comprising instructions stored thereon that are executable by at least one processor to cause a computing device to perform operations comprising:
receiving a user query;
comparing the user query to each of a plurality of scenario groups to determine a scenario group most similar to the user query;
identifying a difficulty level associated with the scenario group most similar to the user query;
based on determining that the difficulty level is a hard level, selecting a candidate scenario of a plurality of scenarios in the scenario group based on the user query and generating a candidate selection rationale using a first machine learning model;
analyzing, using a second machine learning model, the user query, the candidate scenario, and the candidate selection rationale to generate a selection decision and selection decision feedback;
based on determining that the selection decision is negative, performing, until a selection decision is positive or a maximum number of iterations has been reached, operations comprising:
selecting a new candidate scenario of the plurality of scenarios in the scenario group and generating a new candidate selection rational for based on the user query and the selection decision feedback, using the first machine learning model; and
generating a new selection decision and new selection decision feedback based on the user query and new candidate selection rationale, using the second machine learning model; and
based on determining that the new selection decision is positive, executing a scenario associated with the new selection decision.

Figure 6:
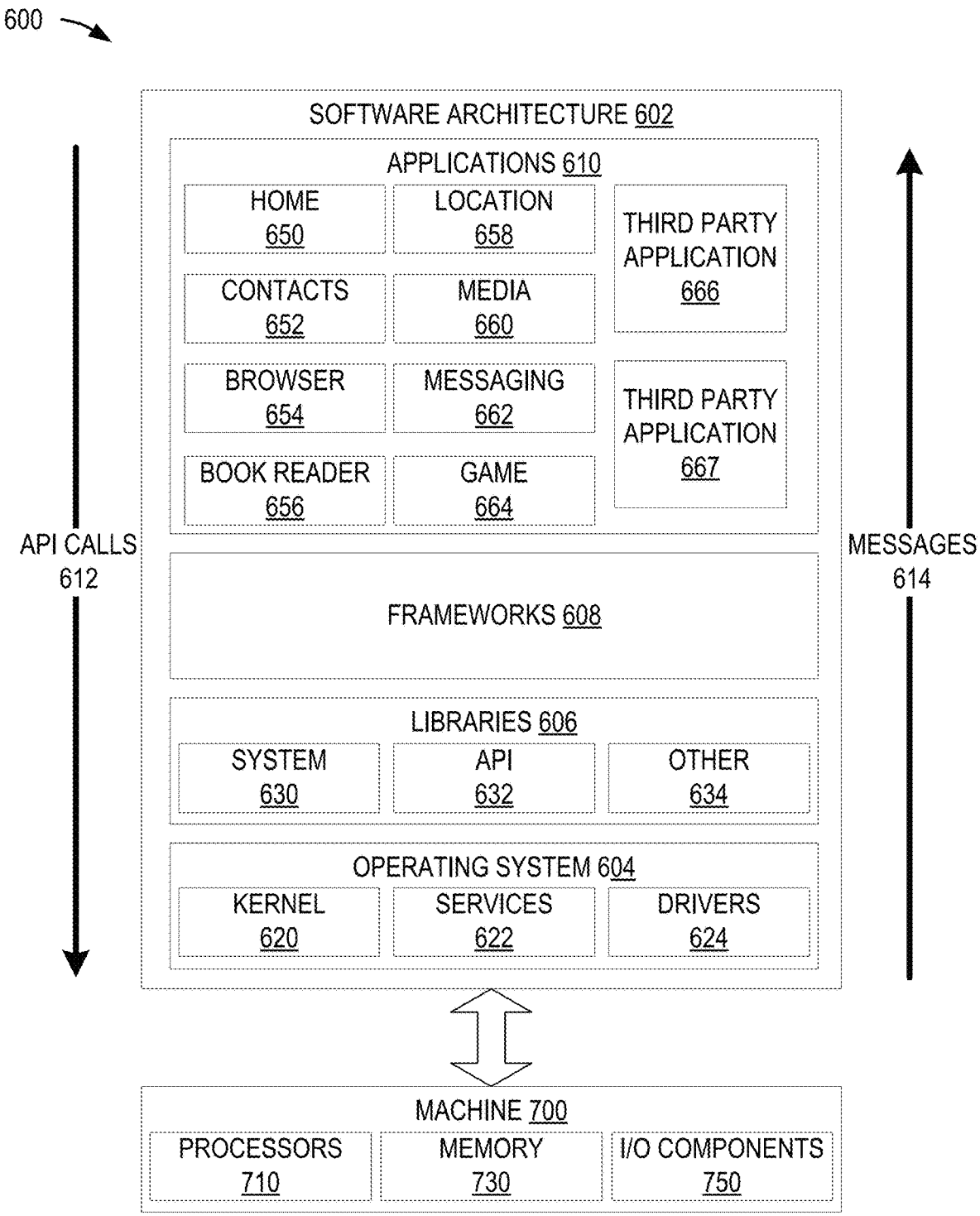
FIG. 6 is a block diagram illustrating an example of a software architecture that may be installed on a machine, according to some examples.

FIG. 6 is a block diagram 600 illustrating software architecture 602, which can be installed on any one or more of the devices described above. For example, in various embodiments, client devices 110 and servers and systems 130, 62, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third-party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
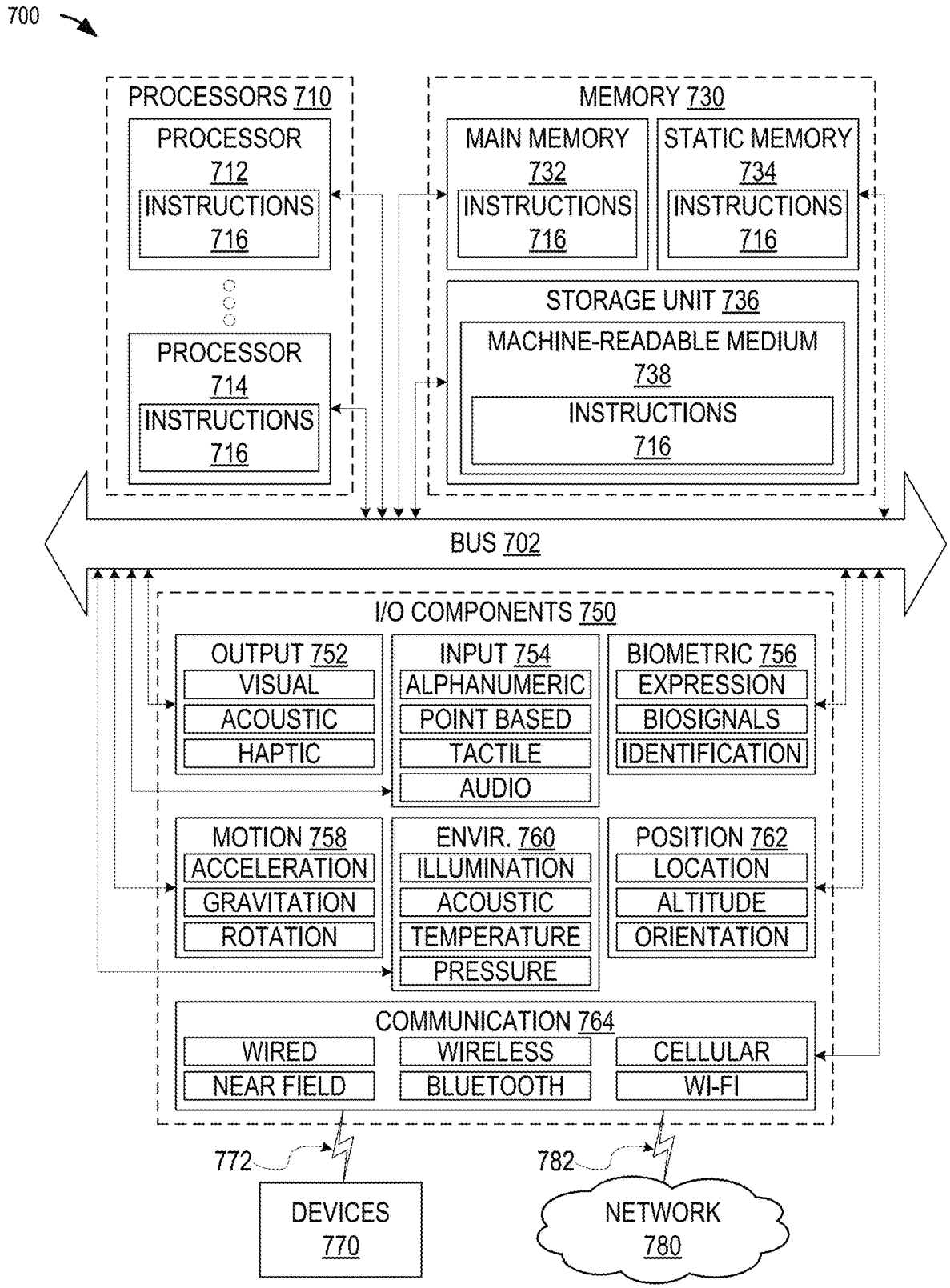
FIG. 7 illustrates a diagrammatic representation of a machine, in the form of a computer system, within which a set of instructions may be executed for causing the machine to perform any one or more of the methodologies discussed herein, according to some examples.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   generating a vector embedding of a user query;
   comparing the vector embedding of the user query to each vector embedding of each of a plurality of scenario groups using a similarity function;
   selecting a scenario group most similar to the user query based on an output of the similarity function, the scenario group comprising a plurality of scenarios;

determining that the scenario group most similar to the user query has an overall similarity score over a predefined value range, indicating that the plurality of scenarios in the scenario group are very similar to each other;

based on determining that the scenario group most similar to the user query has an overall similarity score over the predefined value range, selecting a candidate scenario of a plurality of scenarios in the scenario group based on the user query and generating a candidate selection rationale using a first machine learning model;

analyzing, using a second machine learning model, the user query, the candidate scenario, and the candidate selection rationale to generate a selection decision and selection decision feedback;

based on determining that the selection decision is negative, performing, until a selection decision is positive or a predefined maximum number of iterations has been reached, operations comprising:

selecting a new candidate scenario of the plurality of scenarios in the scenario group and generating a new candidate selection rational based on the user query and the selection decision feedback, using the first machine learning model; and generating a new selection decision and new selection decision feedback based on the user query and new candidate selection rationale, using the second machine learning model; and based on determining that the new selection decision is positive, executing a scenario associated with the new selection decision.

2. The computer-implemented method of claim 1, wherein based on determining that the selection decision is negative and the predefined maximum number of iterations has been reached, requesting further information about the user query.

3. The computer-implemented method of claim 1, further comprising:

receiving a second user query;

comparing the second user query to each of the plurality of scenario groups to determine a second scenario group most similar to the second user query;

determining that the second scenario group most similar to the second user query has an overall similarity score below a predefined value;

based on determining that the second scenario group most similar to the second user query had an overall similarity score below the predefined value, comparing the second user query to each scenario of a plurality of scenarios in the second scenario group to determine a scenario most similar to the second user query; and executing the scenario most similar to the second user query to generate a response to the second user query.

4. The computer-implemented method of claim 3, wherein comparing the second user query to each scenario of the plurality of scenarios in the second scenario group comprises using a semantic or hybrid similarity search to determine the scenario most similar to the second user query.

5. The computer-implemented method of claim 1, further comprising:

receiving a second user query;

comparing the second user query to each of the plurality of scenario groups to determine a second scenario group most similar to the second user query;

determining that the second scenario group most similar to the second user query has an overall similarity score within a predefined value range;

based on determining that the second scenario group most similar to the second user query had an overall similarity score within the predefined value range, analyzing, using a third machine learning model the second user query and each scenario of a plurality of scenarios in the second scenario group to determine a scenario most similar to the second user query; and executing a scenario most similar to the second user query to generate a response to the second user query.

6. The computer-implemented method of claim 1, further comprising:

generating the plurality of scenario groups from a plurality of application programming interface (API) endpoints, each scenario group of the plurality of scenario groups comprising one or more scenario, each scenario comprising an API endpoint;

rewriting a description corresponding to each API endpoint using a machine learning model to generate a structured format description for each scenario; and generating a vector embedding of the structured format description for each scenario.

7. The computer-implemented method of claim 6 wherein the plurality of scenario groups are generated based on a URL structure of each API endpoint.

8. The computer-implemented method of claim 6 wherein the description corresponding to each API endpoint comprises at least one of an API endpoint description, a name of the API endpoint, or API parameters.

9. The computer-implemented method of claim 6, further comprising:

for each scenario group, determining a similarity between each vector embedding for each pair of scenarios in the scenario group to generate an overall similarity score for each scenario group; and assigning a difficultly level to each scenario group based on the overall similarity score.

10. The computer-implemented method of claim 1, wherein executing the scenario associated with the new selection decision comprises executing an API endpoint for the scenario associated with the new selection decision.

11. A system comprising:

a memory that stores instructions; and one or more processors configured by the instructions to perform operations comprising:

generating a vector embedding of a user query;

comparing the vector embedding of the user query to each vector embedding of each of a plurality of scenario groups using a similarity function;

selecting a scenario group most similar to the user query based on an output of the similarity function, the scenario group comprising a plurality of scenarios;

determining that the scenario group most similar to the user query has an overall similarity score over a predefined value range, indicating that the plurality of scenarios in the scenario group are very similar to each other;

based on determining that the scenario group most similar to the user query has an overall similarity score over the predefined value range, selecting a candidate scenario of a plurality of scenarios in the scenario group based on the user query and generating a candidate selection rationale using a first machine learning model;

analyzing, using a second machine learning model, the user query, the candidate scenario, and the candidate selection rationale to generate a selection decision and selection decision feedback;

based on determining that the selection decision is negative, performing, until a selection decision is positive or a predefined maximum number of iterations has been reached, operations comprising:

selecting a new candidate scenario of the plurality of scenarios in the scenario group and generating a new candidate selection rational based on the user query and the selection decision feedback, using the first machine learning model; and generating a new selection decision and new selection decision feedback based on the user query and new candidate selection rationale, using the second machine learning model; and based on determining that the new selection decision is positive, executing a scenario associated with the new selection decision.

12. The system of claim 11, wherein based on determining that the selection decision is negative and the predefined maximum number of iterations has been reached, requesting further information about the user query.

13. The system of claim 11, the operations further comprising:

receiving a second user query;

comparing the second user query to each of the plurality of scenario groups to determine a second scenario group most similar to the second user query;

determining that the second scenario group most similar to the second user query has an overall similarity score below a predefined value;

based on determining that the second scenario group most similar to the second user query had an overall similarity score below the predefined value, comparing the second user query to each scenario of a plurality of scenarios in the second scenario group to determine a scenario most similar to the second user query; and executing the scenario most similar to the second user query to generate a response to the second user query.

14. The system of claim 13, wherein comparing the second user query to each scenario of the plurality of scenarios in the second scenario group comprises using a semantic or hybrid similarity search to determine the scenario most similar to the second user query.

15. The system of claim 11, the operations further comprising:

receiving a second user query;

comparing the second user query to each of the plurality of scenario groups to determine a second scenario group most similar to the second user query;

determining that the second scenario group most similar to the second user query has an overall similarity score within a predefined value range;

based on determining that the second scenario group most similar to the second user query had an overall similarity score within the predefined value range, analyzing, using a third machine learning model the second user query and each scenario of a plurality of scenarios in the second scenario group to determine a scenario most similar to the second user query; and executing a scenario most similar to the second user query to generate a response to the second user query.

16. The system of claim 11, the operations further comprising:

generating the plurality of scenario groups from a plurality of application programming interface (API) endpoints, each scenario group of the plurality of scenario groups comprising one or more scenario, each scenario comprising an API endpoint;

rewriting a description corresponding to each API endpoint using a machine learning model to generate a structured format description for each scenario; and generating a vector embedding of the structured format description for each scenario.

17. The system of claim 16, wherein the plurality of scenario groups are generated based on a URL structure of each API endpoint.

18. A non-transitory computer-readable medium comprising instructions stored thereon that are executable by at least one processor to cause a computing device to perform operations comprising:

generating a vector embedding of a user query;

comparing the vector embedding of the user query to each vector embedding of each of a plurality of scenario groups using a similarity function;

selecting a scenario group most similar to the user query based on an output of the similarity function, the scenario group comprising a plurality of scenarios;

determining that the scenario group most similar to the user query has an overall similarity score over a predefined value range, indicating that the plurality of scenarios in the scenario group are very similar to each other;

based on determining that the scenario group most similar to the user query has an overall similarity score over the predefined value range, selecting a candidate scenario of a plurality of scenarios in the scenario group based on the user query and generating a candidate selection rationale using a first machine learning model;

analyzing, using a second machine learning model, the user query, the candidate scenario, and the candidate selection rationale to generate a selection decision and selection decision feedback;

based on determining that the selection decision is negative, performing, until a selection decision is positive or a predefined maximum number of iterations has been reached, operations comprising:

selecting a new candidate scenario of the plurality of scenarios in the scenario group and generating a new candidate selection rational based on the user query and the selection decision feedback, using the first machine learning model; and generating a new selection decision and new selection decision feedback based on the user query and new candidate selection rationale, using the second machine learning model; and based on determining that the new selection decision is positive, executing a scenario associated with the new selection decision.

* * * * *